US008505246B1

(12) United States Patent
Cadorath

(10) Patent No.: US 8,505,246 B1
(45) Date of Patent: Aug. 13, 2013

(54) SCREEN ROOM WITH PIVOTING ROOF PANELS

(75) Inventor: Gerald J. Cadorath, Winnipeg (CA)

(73) Assignee: Cadorath Leisure Products Ltd., Winnipeg, Manitoba (CA)

( * ) Notice: Subject to any disclaimer, the term of this patent is extended or adjusted under 35 U.S.C. 154(b) by 0 days.

(21) Appl. No.: 13/267,649

(22) Filed: Oct. 6, 2011

(51) Int. Cl.
*E04H 1/00* (2006.01)

(52) U.S. Cl.
USPC ................. 52/79.6; 52/79.5; 52/79.12; 52/66; 52/71

(58) Field of Classification Search
USPC ................. 52/79.1, 79.5, 79.6, 79.12, 71, 72, 52/63, 222, 273, DIG. 17
See application file for complete search history.

(56) References Cited

U.S. PATENT DOCUMENTS

| | | | | | |
|---|---|---|---|---|---|
| 849,709 | A | * | 4/1907 | Wingren | 52/63 |
| 919,361 | A | * | 4/1909 | Keen | 52/63 |
| 1,656,545 | A | * | 1/1928 | Tuthill | 52/63 |
| 1,724,577 | A | * | 8/1929 | Gritzner | 52/69 |
| 2,098,469 | A | | 11/1937 | Smith | |
| 2,208,010 | A | * | 7/1940 | Whitmore | 52/92.2 |
| 2,218,765 | A | | 10/1949 | Morgan | |
| 2,572,461 | A | | 10/1951 | Fierle | |
| 2,704,301 | A | * | 3/1955 | Feketics | 174/373 |
| 2,745,420 | A | * | 5/1956 | Zitomer | 52/63 |
| 2,765,362 | A | * | 10/1956 | Lindgren | 174/374 |
| 2,765,498 | A | * | 10/1956 | Kelnhofer | 52/70 |
| 4,066,089 | A | * | 1/1978 | Rainwater | 135/151 |
| 4,167,838 | A | * | 9/1979 | Metheny | 52/79.5 |
| 5,555,681 | A | * | 9/1996 | Cawthon | 52/63 |
| 5,596,844 | A | * | 1/1997 | Kalinowski | 52/79.5 |
| 5,655,335 | A | * | 8/1997 | Vermeer | 52/66 |
| 5,657,583 | A | * | 8/1997 | Tennant | 52/79.5 |
| 5,813,169 | A | | 9/1998 | Engerman | |
| 6,003,279 | A | * | 12/1999 | Schneider | 52/481.1 |
| 6,491,643 | B2 | * | 12/2002 | Katzman et al. | 600/532 |
| 6,604,328 | B1 | * | 8/2003 | Paddock | 52/93.1 |
| 6,978,573 | B2 | * | 12/2005 | Van Der Heijden | 47/17 |
| 7,475,514 | B2 | * | 1/2009 | Rulquin et al. | 52/79.5 |
| 8,201,362 | B2 | * | 6/2012 | Alford et al. | 52/69 |
| 8,286,391 | B2 | * | 10/2012 | Yang et al. | 52/69 |
| 2005/0229956 | A1 | | 10/2005 | Merritt | |
| 2007/0017163 | A1 | | 1/2007 | Silberman | |
| 2009/0173462 | A1 | | 7/2009 | Elfers | |
| 2011/0258961 | A1 | * | 10/2011 | LaCasse | 52/653.2 |

* cited by examiner

*Primary Examiner* — William Gilbert
*Assistant Examiner* — Gisele Ford
(74) *Attorney, Agent, or Firm* — Nikolai & Mersereau, P.A.; Thomas J. Nikolai

(57) ABSTRACT

An outdoor screen room for creating a bug-free environment comprises a plurality of upright screened sidewalls held in a framework that also supports a plurality of screened roof panels that are pivotally attached to the framework, allowing them to be shifted between an enclosure-covering disposition for summer use and a vertical disposition during winter months when snow loads on a horizontal or a slightly pitched roof may be a problem.

2 Claims, 3 Drawing Sheets

SCREEN ROOM WITH PIVOTING ROOF PANELS

FIELD OF THE INVENTION

This invention relates generally to screened enclosures for creating a bug-free environment and more particularly to a screen room having roof panels that can be made to pivot between an enclosure-covering roof position and a vertical disposition.

DISCUSSION OF THE PRIOR ART

During summer months in many areas, it is difficult to enjoy being out-of-doors because of mosquitoes and other flying and biting insects. So-called screen houses or screen rooms have been designed for use in a patio or in the yard to provide an environment where evening breezes can be enjoyed, but insects are blocked from entering the screened space.

Screen rooms of the prior art typically comprise a plurality of individual screened wall panels mounted on a framework to define a rectangular or other polygonal interior space with a screened entry door. A roof structure commonly comprises a water-impervious fabric overlaying the wall arrangement. This design offers the advantage of sheltering the occupants and/or furniture from rain, but it renders the structure vulnerable to strong winds. For this reason, screen rooms have also been designed to have the roof structure also comprise screened panels which are effective to preclude insect entry, but also are significantly less vulnerable to damage from strong winds than a water impervious fabric roof.

The use of screened roof panels on screen rooms has created a different problem in climates where winter snow can be expected to fall. Screen rooms of practical size necessarily incorporate screened roof panels of appreciable area and the weight of wet snow thereon can readily distort and even collapse the frame structure of the screen room. This has necessitated the disassembly of such screen rooms in the fall of the year and erection again the following spring.

The present invention employs a simple, yet highly novel and non-obvious technique for obviating this problem.

SUMMARY OF THE INVENTION

In accordance with the present invention, there is provided a screen room with a framework defining an enclosure to which is mounted a plurality of vertical, screened side walls and supporting a plurality of screened roof panels where the screened roof panels are pivotally joined to the framework for movement between an enclosure-covering disposition and a vertical orientation. When in the vertical orientation, only a miniscule surface area is exposed to snow loads.

DESCRIPTION OF THE DRAWINGS

The foregoing features, objects and advantages of the invention will become apparent to those skilled in the art from the following detailed description of a preferred embodiment, especially when considered in conjunction with the accompanying drawings in which like numerals in the several views refer to corresponding parts.

DESCRIPTION OF THE PREFERRED EMBODIMENT

Figure 1:
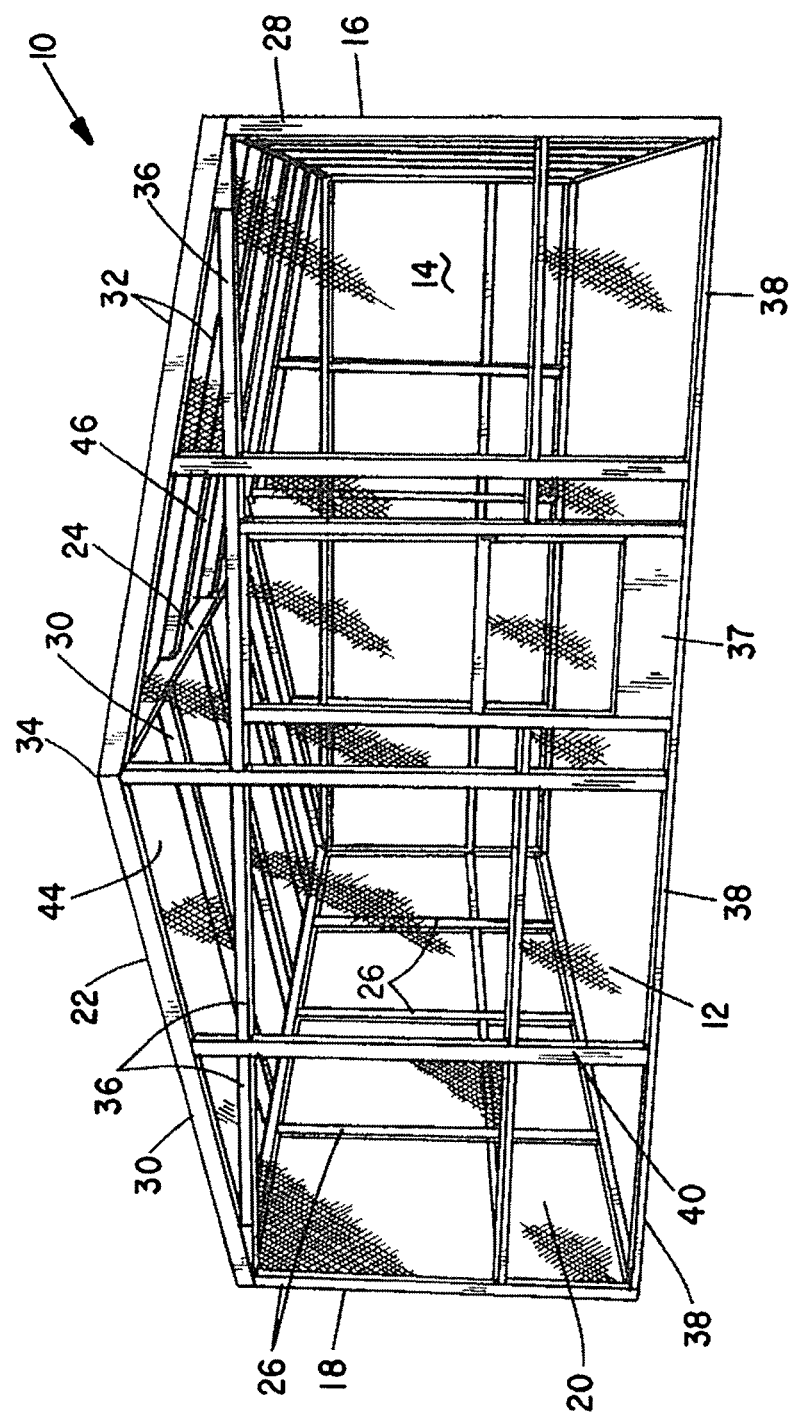
FIG. 1 is an exterior, perspective view of a screen room incorporating the present invention.

This description of the preferred embodiments is intended to be read in connection with the accompanying drawings, which are to be considered part of the entire written description of this invention. In the description, relative terms such as "lower", "upper", "horizontal", "vertical", "above", "below", "up", "down", "top" and "bottom" as well as derivatives thereof (e.g., "horizontally", "downwardly", "upwardly", etc.) should be construed to refer to the orientation as then described or as shown in the drawings under discussion. These relative terms are for convenience of description and do not require that the apparatus be constructed or operated in a particular orientation. Terms such as "connected", "connecting", "attached", "attaching", "join" and "joining" are used interchangeably and refer to one structure or surface being secured to another structure or surface or integrally fabricated in one piece, unless expressively described otherwise.

Referring to FIG. 1, there is shown a perspective, exterior view of a screen room that incorporates the present invention. The screen room is identified generally by numeral 10 and is seen to comprise a generally rectangular enclosure having a front wall 12, a rear wall 14 and opposed end walls 16 and 18. Each of these side and end walls comprises a plurality of screened panels, as at 20, disposed in side-by-side relationship and held in place by a framework comprising a plurality of extruded aluminum gable members 22 disposed in a parallel and spaced-apart relationship by elongated roof ridge divider bars 24 extending therebetween. The gable members 22 each comprise left and right vertical posts 26 and 28 with roof panel supporting rafters 30 and 32 connected at a predetermined slope angle to an upper end of the posts, the rafters 30 and 32 being joined together at their free ends along a roof ridge line 34. Brackets 35 fastened to the roof supporting rafters at the junction where the ends come together are used to mount the ridge divider bars 24 in place between adjacent pairs of roof rafters.

Without limitation, the screen room may measure up to 40 feet wide by as long as the customer wants in five feet increments, where each of the walls comprise a plurality of screen panels 20 that are approximately 5 feet in width and 7 to 20 feet in height. One of the panels may comprise a screened entry door shown, at 37 in FIG. 1.

Each of the screen panels 20 has a rectangular frame comprising extruded aluminum top rails 36 and bottom end rails 38 and left and right side rails 40, 42, respectively. The rails are joined to one another by screw fasteners (not shown) and supporting a mesh screening material, such as 0.013 in. yarn diameter fiberglass mesh covering the rectangular frame opening.

As seen in FIG. 1, each of the opposed gabled end walls supports a pair of right angle triangular trusses 44, 46 with their vertical legs in abutting relationship. Aluminum ridge divider bars 24 extend between the triangular screened trusses at the room's opposed front and rear walls.

Roof screen panels, as at 48, are pivotally supported between the triangular screen trusses and the roof panel supporting rafter 30, 32 of an adjacent gable member, as well as between each of the roof panel supporting rafters of adjacent gable members that are disposed between the opposed end walls 16 and 18 by means of pivot pins 50 and 50' joining the roof screen panels 48 to the rafters 30, 32 on opposed sides of the roof screen panels 48.

Figure 2:
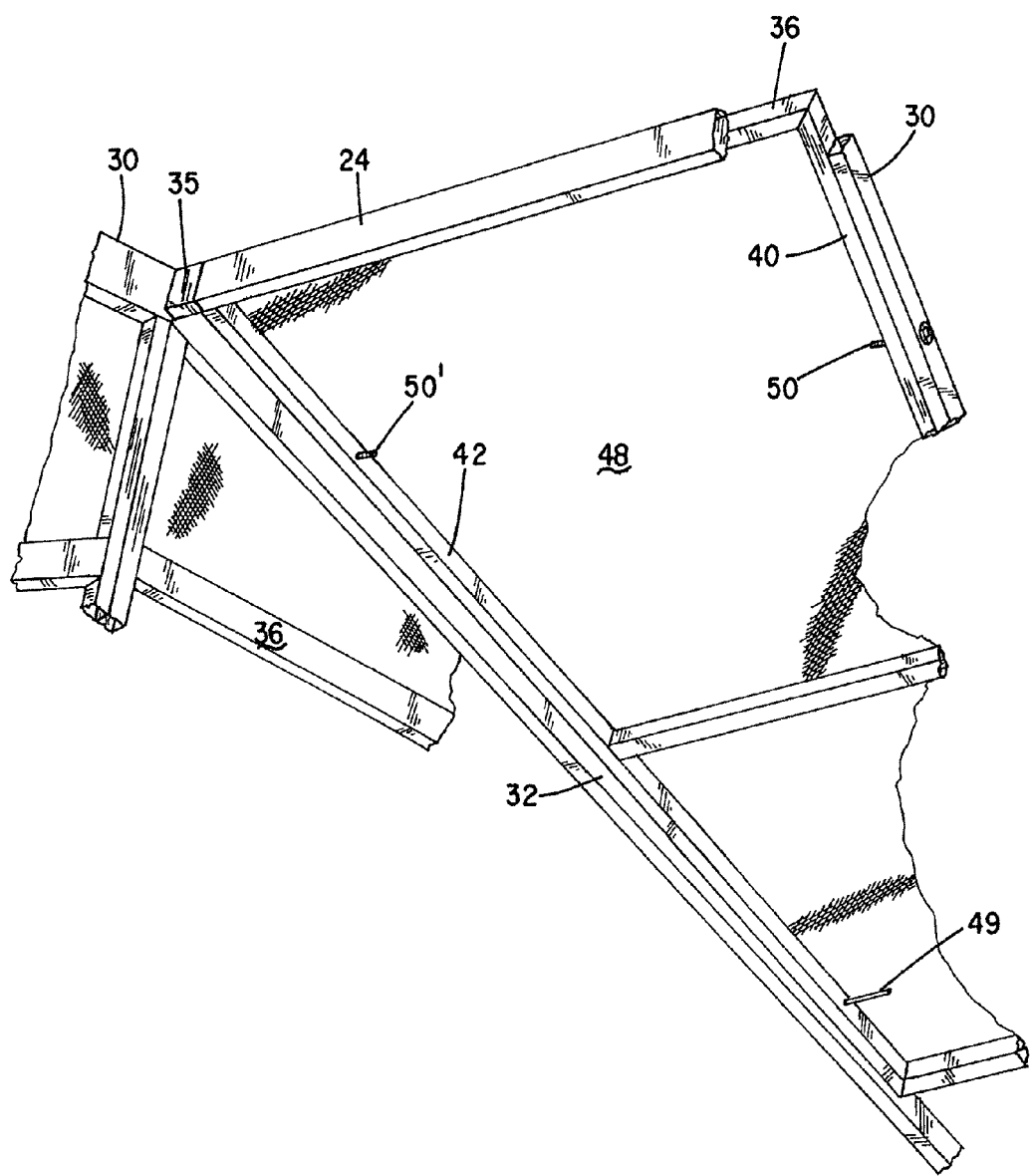
FIG. 2 is a partial interior view of the screen room of FIG. 1 showing a corner portion of the room with the roof panel in its enclosure covering disposition.
Figure 3:
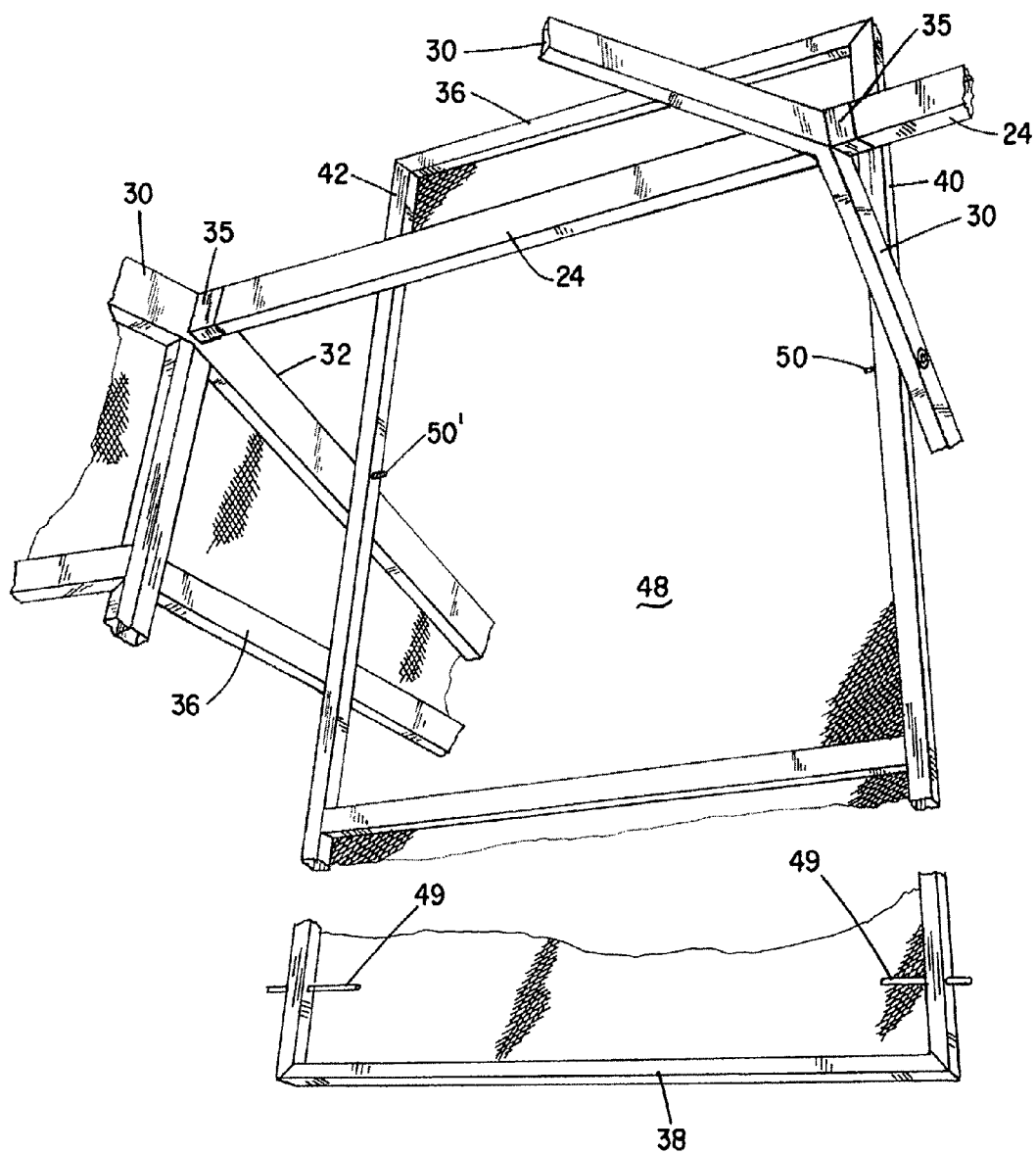
FIG. 3 is an interior view of the screen room like that of FIG. 2, but with one of the roof panels in its vertical (winter) orientation.

During summer months, the roof screen panels are pinned in place in linear alignment with the roof rafters of adjacent gable members to thereby create a pitch roof that blocks entry of insects into the interior of the assembled screen room 10. In late fall, before a first snowfall is expected, the owner need only remove a retainer pin 49 (FIG. 2) that extends through the side rails 40 and 42 of the roof screen panels and into an aligned bore in an adjacent gable rafter 30, thereby allowing the roof screens to swing down about pivot pins 50, 50' into a vertical disposition, as shown in FIG. 3, such that there can be no buildup of a snow load on the roof of the screen room. Again, the retainer pin 49 may now be inserted through aligned holes in screen rail 42 and the gable post 26 or 28 to releasably latch the now vertical screened panel to an adjacent vertical gable post to prevent it from swinging in the wind. In the spring, the owner can again elevate the roof screen panels 48 to their roof covering position by first removing the retainer pins 49 and rotating the roof covering screen panels about pivot pins 50, 50' and reinserting the pivot pins into holes in the rafters 30, 32.

Those skilled in the art can appreciate that the screen room needs not have a square base, but may comprise a rectangle or other polygonal shape. In the case of an octagonal-shaped gazebo structure, the roof panels are designed to be triangular in a plan view and would be pivotally mounted between an adjacent pair of roof panel supporting rafters.

This invention has been described herein in considerable detail in order to comply with the patent statutes and to provide those skilled in the art with the information needed to apply the novel principles and to construct and use such specialized components as are required. However, it is to be understood that the invention can be carried out by specifically different equipment and devices, and that various modifications, both as to the equipment and operating procedures, can be accomplished without departing from the scope of the invention itself.

What is claimed is:

1. A screen room comprising:

a front wall, a rear wall and a pair of end walls defining an interior space, each of said walls comprising a plurality of screen panels, each screen panel having a rectangular frame comprising extruded metal end rails and side rails joined to one another and supporting mesh screening material, each of the end walls supporting triangular, screened trusses;

a plurality of gable members, each comprising a vertical post and a roof panel supporting rafter, the gable members being held in parallel spaced-apart relation by elongated ridge divider bars extending between the triangular screened trusses, the screen panels being mounted between the vertical post of adjacent gable members in coplanar relationship in forming the side walls; and a plurality of screened roof panels pivotally supported and releasably latched either between the triangular screen trusses and a roof panel supporting rafter of an adjacent gable member or between roof panel supporting rafters of adjacent gable members, said roof screen panels being shiftable between an inclined roof-forming disposition during summer months and a vertical disposition within said interior space during the winter months such that the roof screen panels need not support snow loads.

2. The screen room of claim 1 and further including an entry door in one of said screen panels comprising one of said walls.

* * * * *